(12) United States Patent
Kadayam Viswanathan et al.

(10) Patent No.: US 12,626,129 B2
(45) Date of Patent: May 12, 2026

(54) COST FUNCTION ENGINEERING FOR ESTIMATING UNCERTAINTY CORRELATED WITH PREDICTION ERRORS

(71) Applicant: Schlumberger Technology Corporation, Sugar Land, TX (US)

(72) Inventors: Ravinath Kausik Kadayam Viswanathan, Sharon, MA (US); Lalitha Venkataramanan, Lexington, MA (US); Andras Szep, Tucson, AZ (US); Lucas Pelegrin, Pulask, WI (US)

(73) Assignee: Schlumberger Technology Corporation, Sugar Land, TX (US)

( * ) Notice: Subject to any disclaimer, the term of this patent is extended or adjusted under 35 U.S.C. 154(b) by 546 days.

(21) Appl. No.: 18/250,123

(22) PCT Filed: Oct. 28, 2021

(86) PCT No.: PCT/US2021/057066
§ 371 (c)(1),
(2) Date: Apr. 21, 2023

(87) PCT Pub. No.: WO2022/094091
PCT Pub. Date: May 5, 2022

(65) Prior Publication Data
US 2023/0385639 A1      Nov. 30, 2023

Related U.S. Application Data

(60) Provisional application No. 63/107,294, filed on Oct. 29, 2020.

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS

| | | | |
|---|---|---|---|
| 11,893,492 B2 * | 2/2024 | Oh ......................... | G06F 9/3834 |
| 2011/0307230 A1 * | 12/2011 | Lee ......................... | G01V 99/00 |
| | | | 703/10 |

(Continued)

FOREIGN PATENT DOCUMENTS

| | | |
|---|---|---|
| EP | 0671038 B1 | 5/2003 |
| WO | 2020185716 A1 | 9/2020 |

OTHER PUBLICATIONS

International Preliminary Report on Patentability issued in the PCT Application PCT/US2021/057066 dated May 11, 2023, 7 pages.

(Continued)

*Primary Examiner* — Christopher E Dunay
(74) *Attorney, Agent, or Firm* — Jeffrey D. Frantz

(57) ABSTRACT

A method and a non-transitory computer readable medium for performing a calculation in a neural network comprise: accepting a data set into the neural network; performing a calculations with the neural network using the data set, wherein the calculations use a loss function and provide an aleatoric and epistemic uncertainty that is correlated to a value; and displaying results of the calculations performed.

20 Claims, 5 Drawing Sheets

(56)  References Cited

U.S. PATENT DOCUMENTS

| | | | | |
|---|---|---|---|---|
| 2015/0096026 A1* | 4/2015 | Kolacinski | ............... | G06N 7/01 |
| | | | | 726/23 |
| 2017/0124448 A1 | 5/2017 | Engel | | |
| 2020/0034661 A1* | 1/2020 | Kim | ..................... | G06V 10/764 |
| 2020/0151547 A1* | 5/2020 | Valpola | .................. | G06N 3/045 |
| 2020/0234086 A1* | 7/2020 | Taha | ........................ | G06N 3/09 |
| 2020/0326667 A1* | 10/2020 | Ahuja | ................. | G06F 18/2431 |

OTHER PUBLICATIONS

International Search Report and Written Opinion issued in the PCT
Application PCT/US2021/057066, dated Feb. 21, 2022 (12 pages).
Gal, Y., and Ghahramani, Z., 2016, Dropout as a Bayesian Approxi-
mation: Representing Model Uncertainty in Deep Learning, ICML
16: Proceedings of the 33rd International Conference on Machine
Learning, New York, New York, JMLR: W&CP 48, 1050-1059.
Prado, A. et al., "Dual Neural Network Architecture for Determin-
ing Epistemic and Aleatoric Uncertainties", arXiv:1910.06153v1,
33rd Conference on Neural Information Processing Systems, Van-
couver, CA, 2019, 5 pages.
Extended Search Report issued in European Patent Application No.
21887524.3 dated Sep. 20, 2024, 8 pages.

* cited by examiner

Prediction plot with uncertainty for dropout (same architecture)

Error/uncertainty correlation for dropout (same architecture)

Prediction plot with error for dropout
(best architecture)

Error/uncertainty correlation for
dropout (best architecture)

COST FUNCTION ENGINEERING FOR ESTIMATING UNCERTAINTY CORRELATED WITH PREDICTION ERRORS

CROSS-REFERENCE TO RELATED APPLICATIONS

The present application is a National Stage Entry of International Application No. PCT/US20/21057066, filed Oct. 28, 2021, which claims priority to U.S. Provisional Patent Application 63/107,294, filed Oct. 29, 2020, the entirety of which is incorporated by reference.

FIELD OF THE DISCLOSURE

Aspects of the disclosure relate to computer programming. More specifically, aspects of the disclosure relate to cost function engineering using neural networks.

BACKGROUND

Deep learning techniques have been shown to be able to provide uncertainties together with point estimates for various classification and regression problems. Enabling these uncertainties to be correlated and calibrated to the error, however, is still considered challenging. Different methods may be used. Methods such as Bayesian neural networks (BNN) and those using dropout for Bayesian inference have become very popular for providing the epistemic uncertainty, while the use of log-likelihood loss function in artificial neural networks (ANN) have incorporated the aleatoric uncertainty.

In practice, the uncertainties are often found to be poorly correlated with the absolute error, questioning their value. BNNs have been traditionally used for epistemic uncertainty estimation by determining the posterior weight distributions of the neural networks, providing us with both a mean and variance of the predicted outputs using variational inference. Recently, dropout as a technique for approximating Bayesian inference has also been successfully introduced and has seen widespread uptake in the community. As these methods are sensitive to the epistemic uncertainty they have also been shown to be useful to differentiate in and out-of-distribution predictions. The aleatoric uncertainty which originates from the data and is inherent to the measurement, could be either homoscedastic or heteroscedastic.

Recently, conventional analysis has addressed the issue of sensitivity of the neural network model to the aleatoric uncertainty with a log-likelihood loss function. They have shown that when such an approach is combined with dropout based variational inference, sensitivity to both epistemic and aleatoric uncertainty can be achieved. But the inherent challenge that the total uncertainty, which is the sum of the aleatoric and epistemic uncertainty is not necessarily well correlated to the absolute error in the prediction, makes the reliance on these uncertainties questionable.

There is a need to provide an analysis technique that will provide aleatoric and epistemic uncertainty in analysis.

There is a further need to take the aleatoric and epistemic uncertainty and correlate this uncertainty to the absolute error in predictions.

There is a further need to provide analysis techniques that are more accurate than conventional analysis techniques.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for performing a calculation is disclosed. The method may comprise providing a neural network and accepting a data set into the neural network. The method may also comprise performing calculations with the neural network using the data set, wherein the calculations use a loss function and provide an aleatoric and epistemic uncertainty that is correlated to a value and displaying results of the calculations performed.

In another embodiment a non-transitory computer readable medium storing a program causing a computer to execute a process is disclosed. The process performed may comprise accepting a data set into a neural network. The process may further comprise performing calculations with the neural network using the data set, wherein the calculations use a loss function and provide an aleatoric and epistemic uncertainty that is correlated to a value and displaying results of the calculations performed.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

FIG. 1 depicts a graph showing cross-validation results for selecting a for a custom loss function. In the left side of FIG. 1, validation error-uncertainty correlation is depicted as a function of a. In the right side of the FIG. 1, validation mean-squared-error is depicted as a function of a.

FIG. 2 depicts a graph showing Pareto front results of the neural network trained with custom loss function in eqn. (1) depicts the trade-off between.

Figure 1:
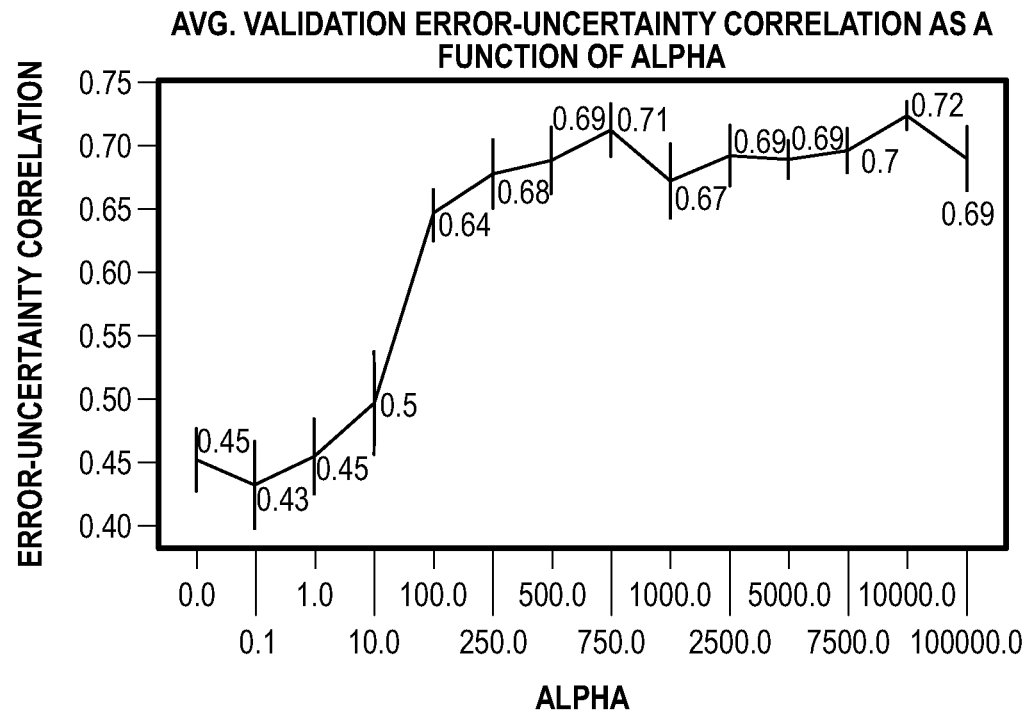
Figure 1:
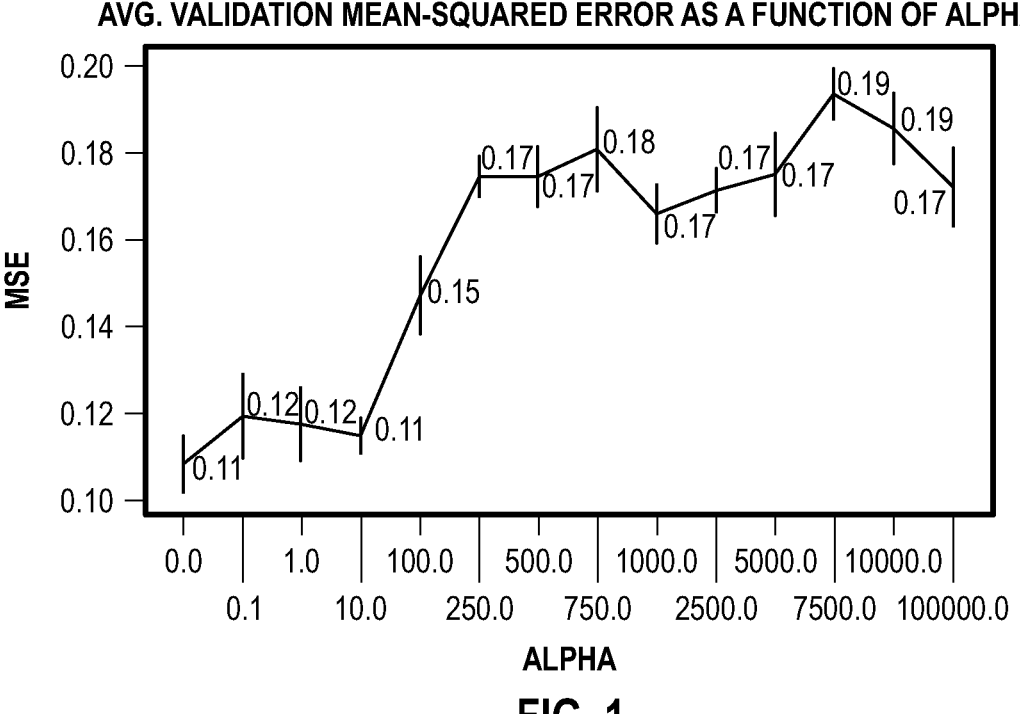

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure provide for a new loss function for ANNs which provides an uncertainty that captures both the epistemic and aleatoric contributions and explicitly correlates it to the prediction bias or error.

A custom loss function for neural networks with three terms as shown below in equation:

$$L(x, y, \theta) = \frac{1}{N}\sum_{i=1}^{N} \frac{1}{\sigma_i^2}\|f_\theta(x_i) - y_i\|^2 + \log[\sigma_i^2] + \alpha(\sigma_i - |f_\theta(x_i) - y_i|)^2 \quad (1)$$

The loss function is minimized with respect to the model parameters $\theta$ and variance $$\sigma_i^2$$

represents the aleatoric uncertainty corresponding to output $y_i$. The first term represents the accuracy of the model while the second term prevents the assignment of very high uncertainty values for all data points. The first two terms are related to addressing aleatoric uncertainty. A third term, which forces the $\sigma_i$ to be a function of not only the measurement $y_i$ but also the model prediction $f_\theta(x_i)$, (thus enabling it to absorb both the epistemic as well as the aleatoric uncertainties. In the limit of infinite data, the model can learn well, thus, from an expectation perspective, the following can be obtained $\sigma_i|y_i - f_{\overline{\theta(x_i)}}|$. Therefore, the third term in cost function is expected to go to zero and the $\sigma_i$ represents the aleatoric uncertainty. The parameter $\alpha$ is a regularization parameter and can be tuned to balance the trade-off between achieving a low mean square error (MSE) versus a high correlation between uncertainty and error.

Demonstration on Synthetic Data

The application of this approach is demonstrated on a synthetic dataset of 3,000 points with six input features ($x_1$ through $x_6$). The features were sampled from a normal distribution with mean values of 0, 3, 0, 5, 0, 0 and standard deviations of 4, 2, 2, 1, 2, 2 respectively. The dependent variable for each row of the synthetic data was generated using equation 1, with an additional noise term $N(0, \sigma_i)$ with $\sigma_i$ sampled from a uniform distribution $U(0,2)$. The synthetic data was randomly split into 80% and 20% to create the training and in-distribution testing datasets, and were normalized based on the training set statistics.

$$y_i = \sin(x_i) + x_2^2 + 2x_1x_3^2 + \sqrt{x_4} + e^{x_2 x_5^2} + \frac{3x_6}{0.2 + |x_1|} + N(0, \sigma_i) \quad (2)$$

A neural network incorporating our custom loss function was constructed to predict the output point estimates as well as its uncertainty simultaneously, with the help of two output neurons. The network architecture consisted of 3 hidden layers with 20 neurons each. A ReLU activation function was used for the hidden layers and an RMSprop optimizer for minimizing the loss function. A dropout percent of 5% during training was added to each of the hidden layers to make the model robust to overfitting. To obtain the optimal a for our custom loss function, we employed a five-fold cross validation and plotted absolute-error versus uncertainty correlation as well as MSE for different alpha values as shown in FIG. 1.

Figure 2:
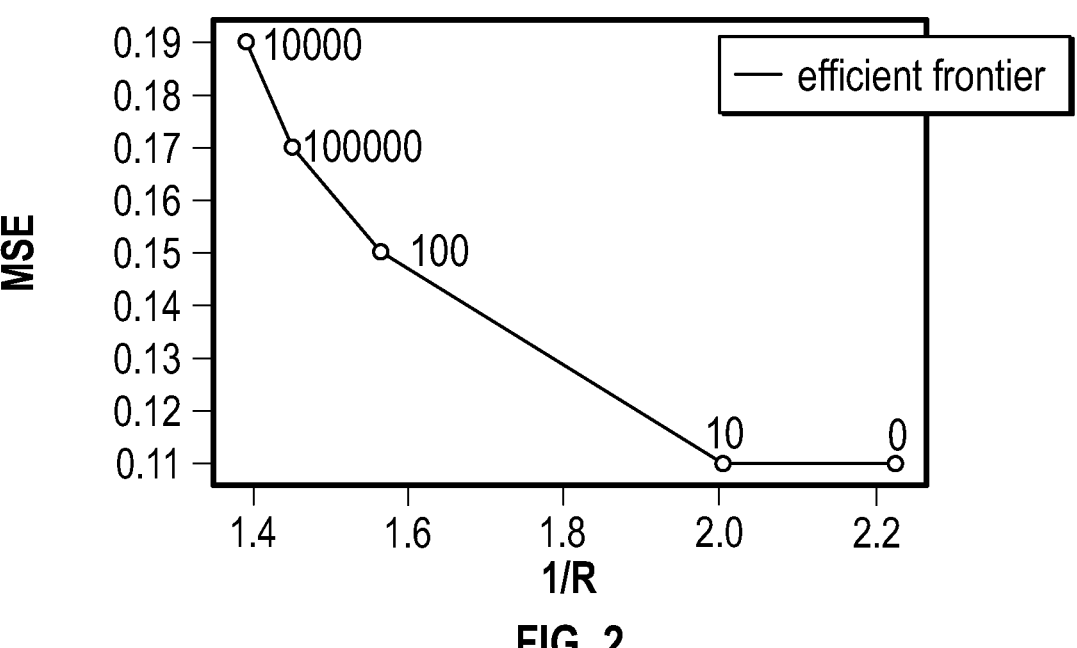

There is an inherent tradeoff between error-uncertainty correlation and prediction accuracy as shown in FIG. 1. At higher α values, the third term of the custom loss function that enforces that the predicted standard deviation be correlated with the absolute error is weighted more than the first two terms. Hence, the error-uncertainty correlation coefficient (R) increases while the MSE, also increases. On the other hand, a very low value of α leads to a low MSE but is also accompanied by a low correlation coefficient. This trade-off between MSE and R obtained by varying α can be depicted in the form of a Pareto front in FIG. 2. Depending on the application, different values of α on this frontier can be selected, based on the importance of the tradeoffs between the two values.

Figure 3:
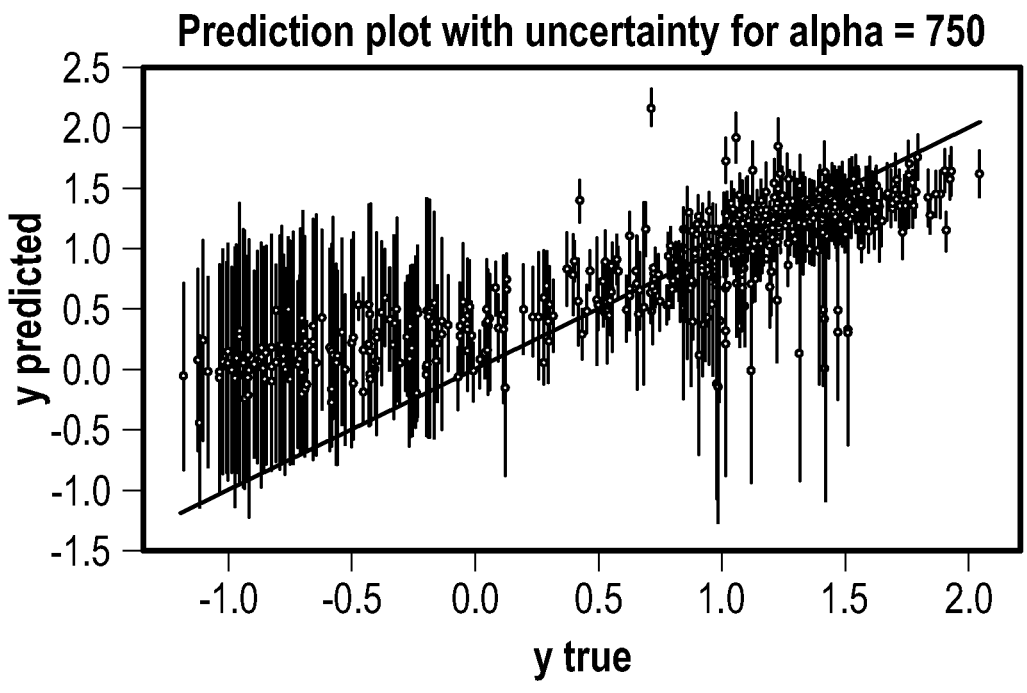
FIG. 3 depicts a graph showing performance results of a neural network trained with the custom loss function from equation (1). The left side of FIG. 3 illustrates an uncertainty (in orange) and y (in blue) predictions on the test set. The right side of FIG. 1 illustrates absolute-error and uncertainty correlation calculated on the test set.
Figure 3:
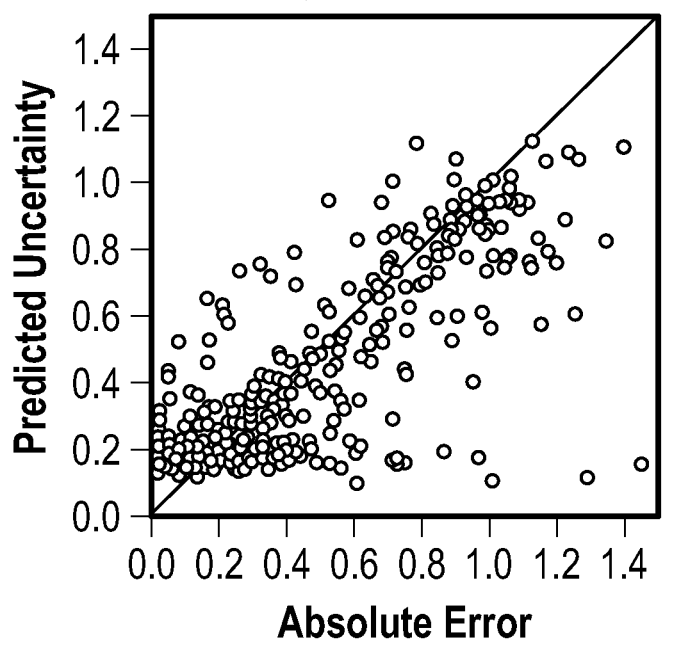

In this example, the performance of the algorithm on a test data set for an optimal α of 750 is shown in FIG. 3. It is observed that the MSE on the figure is small while the uncertainties are also highly correlated with the prediction error.

Figure 4:
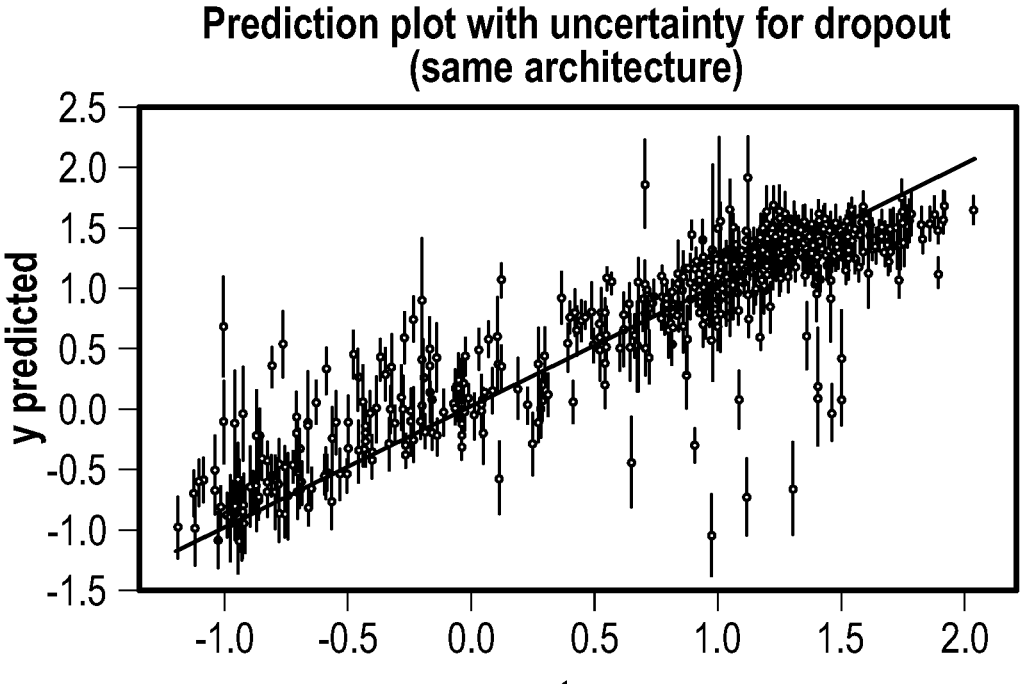
FIG. 4 depicts a graph showing performance results of the neural network with the same architecture as the network with the custom loss function but using dropout to estimate uncertainty. In the left side of FIG. 4, calculated uncertainty (in orange) is presented and predicted y (in blue) on the test set. In the right side of FIG. 4, absolute-error and uncertainty correlation are calculated on a test set.
Figure 4:
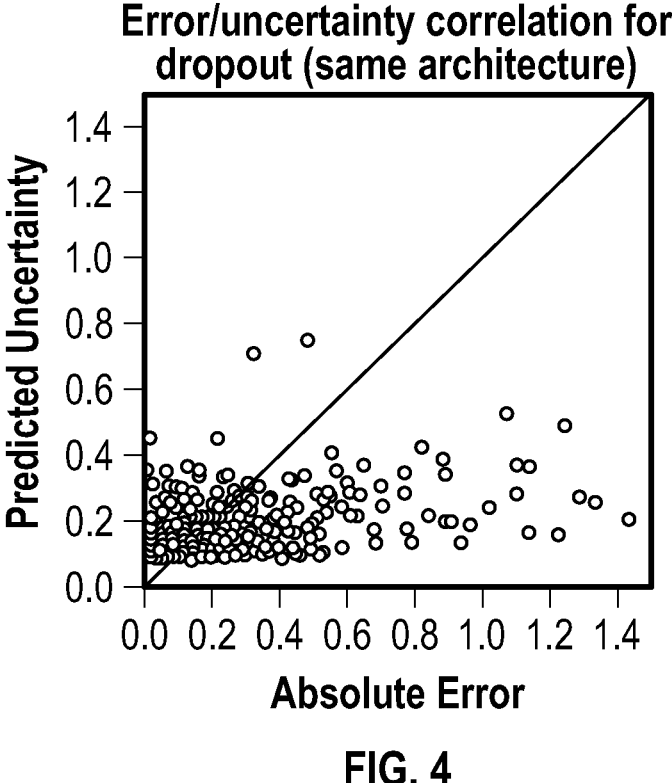

For comparison we create a second neural network with the same architecture but optimized for MSE to predict the point estimate, incorporated with 20% dropout during testing and run 500 times to also help predict the standard deviation of the predictions. The performance of this network is shown in FIG. 4.

Figure 5:
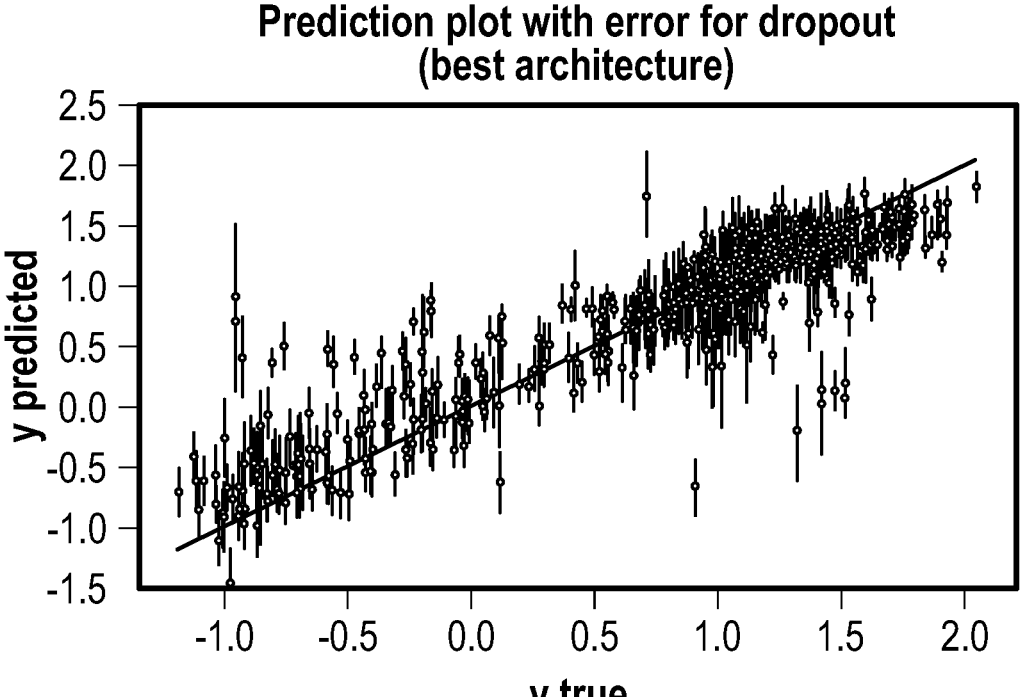
FIG. 5 depicts a graph showing performance results of a neural network architecture found for estimating uncertainty with dropout. In the left side of FIG. 5, calculated uncertainty (in orange) is presented and predicted y (in blue) on the test set. In the right side of FIG. 5, absolute-error and uncertainty correlation calculated on the test set.
Figure 5:
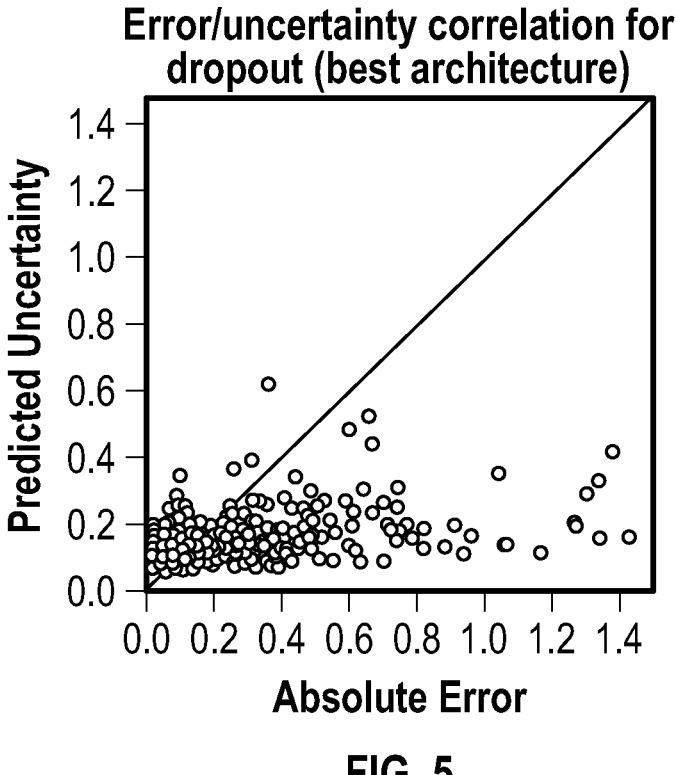

A third dropout BNN was also created but with its architecture tuned to obtain the best possible MSE for comparison. The results of this network on the same testing data is shown in FIG. 5. In the case of the custom loss function, we can substantially increase the correlation between the model's predicted uncertainty and prediction error in exchange for a slight sacrifice in the MSE as summarized in Table 1.

TABLE 1

Prediction error and absolute-error/uncertainty
correlation for each model.

| | Test set prediction error (MSE) | Error-uncertainty correlation (Pearson's R) |
|---|---|---|
| Neural network with custom loss function (FIG. 3) | 0.16 | 0.84 |
| Neural network with same architecture and dropout (FIG. 4) | 0.13 | 0.15 |
| Best neural network for dropout (FIG. 5) | 0.15 | 0.40 |

Aspects of the disclosure provide for a loss function that may be used, for example, with artificial neural networks. These artificial neural networks may be used to provide analysis of data to aid in various functions of data processing. For example, data may be obtained from a geological scan for a hydrocarbon recovery project, and may be analyzed through the use of an artificial neural network to allow for evaluation of potential hydrocarbons trapped within strata of a geological formation. The artificial neural network may be used to separate data that would be indicative of the presence of hydrocarbons from portions of a geological stratum that would not provide for any hydrocarbon recovery. The data may be grouped, for example, in such a situation to determine where the highest concentrations of hydrocarbons may occur in order to establish a model of the geological parameters. This model may be a two-dimensional or a three-dimensional model to allow geological engineers to determine the size, location and cost that would be associated with developing any hydrocarbon reservoir determined by the geological scan. A drilling plan may be then established to determine if a single or multiple wells may be created in order to exploit the hydrocarbon reserves located beneath the surface. In one example embodiment, the drilling plan may be used to determine if a single complex geometry well could be used to recover hydrocarbons from the geological formation to limit the amount of drilling and maximize the potential profit from the drilling operation.

In other embodiments, other types of data may be evaluated through the use of the artificial neural network that employs embodiments of the disclosure. For example, embodiments of the artificial neural network may be employed to evaluate data related to a wireline scan that is achieved to determine various geological formation parameters. As will be understood, certain geological parameters can significantly impact the analysis of determining the size and location of a hydrocarbon field. By quickly and efficiently setting up an artificial neural network using embodiments of the disclosure, data outliers may be excluded from analysis providing a more robust evaluation that may be more accurate and cost-efficient from a computing standpoint. Lessons learned from previous evaluations may be fed back into the artificial neural network thereby providing an even greater efficiency for the evaluation process. As will be understood, with greater training, the artificial neural network may include greater numbers of nodes and potential feedback thereby creating a system that will allow for identification of potential errors and exclusion of extraneous data from large and complex data sets. As will be understood, various numbers of nodes and levels may be provided in different aspects of the disclosure.

In embodiments, synthetic data may be used to repetitively train the artificial neural network using multiple repetitions to allow the artificial neural network to be capable of handling real-world data with minimal error the first time the artificial neural network is used. Such use of artificial neural networks may reduce the overall cost of an engineering operation for a hydrocarbon well based upon the accurate and swift evaluation of multiple data streams provided to the artificial neural network. As an example, data may be gathered together such that the important factor for the project is the minimal cost engineering expenditures for the establishment of wells to tap the hydrocarbon reservoir. Such an evaluation basis may be different than providing a drilling plan that would maximize the overall amount of hydrocarbons recovered from the geological stratum. In such instances, the use of the artificial neural network would minimize capital outlay for a potential drilling operation thereby allowing the drilling operation to be performed wherein operator may have minimal capital expenditure capabilities. Thus, a hydrocarbon recovery well may be established that takes cost engineering into account to exploit the geological formation in the most cost productive way possible.

In other evaluations, the artificial neural network may be used in well rework in order to reestablish hydrocarbon flow in a previously drilled well. Data may be obtained from various sources including seismic, wireline or other evaluation intensive techniques to allow an engineer the ability to maximize fluid flow from a pre-existing reservoir and a pre-existing well. Such rework may include use of chemicals within the well to stimulate fluids flowing within the well. Estimates may be determined based upon the data analyzed to establish a rate of return for the capital expended on the pre-existing well compared to the expected amount of hydrocarbons recovered from well activities. In using such neural networks, the amount of chemicals utilized for well stimulation may be minimized, thereby creating an environmental benefit for well stimulation activities. Minimizing the amount of chemicals used for stimulation of the well would also increase the overall capital return from well production activities as such initial cost expenditures would be minimized as well as the amount of rework performed in the field.

Prior analysis from other jobsites may be also inputted into the neural network to allow, for example, the amount and selection of chemicals used for stimulation activities. For example, a cost-benefit analysis of each chemical used in a wellbore setting may be provided to engineers to allow for the most cost-efficient selection of chemicals used for stimulation purposes. Thus, costs for development of the flow within the wellbore may be minimized while the maximum amount of hydrocarbons recovered is maximized.

In order to perform such evaluations, cost function engineering may be performed by the artificial neural network on a computer, a server, a laptop, or other computing apparatus at a jobsite or at a base location. The data may be fed into the artificial neural network which is programmed into the computing apparatus to allow for evaluation of the data into its desired format. Data may be shared with a client as it is evaluated out of the neural network or may be summarized and presented to a client based upon the choice of a computer architect. In embodiments, the computer architect may choose to provide a link to the artificial neural network through a data connection that would entail use of an Internet, wireless or other data transfer mechanism. In embodiments, the artificial neural network may be placed on the Internet for evaluation of data coming from multiple sources at one time, or the artificial neural network may be a stand-alone system that only provided evaluation capability of a single set of data fed into the network. The artificial neural network may be placed upon a compact disc, universal serial bus apparatus, server, or other recording and playback means to allow for transport of the artificial neural network to a field location or location other than a single site location. Evaluation of data may be performed in a real-time analysis wherein crews from a wireline operation may instantly feed data coming from a wellbore analysis to provide operators insights as to areas of interest of the wellbore during analysis types. Such capabilities would allow for further data to be obtained from these areas of interest greatly enhancing analysis in areas that are more profitable than without the use of the artificial neural network. When utilizing this capability, the artificial neural network provides a reduction in field activities whereby data obtained from the wellbore is of a higher-quality and concentrated in areas that are needed compared to providing an analysis of an entire wellbore that perhaps would generate significant amounts of data that are not pertinent to wellbore areas of interest.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

In one example embodiment, a method for performing a calculation is disclosed. The method may comprise providing a neural network and accepting a data set into the neural network. The method may also comprise performing calculations with the neural network using the data set, wherein the calculations use a loss function and provide an aleatoric and epistemic uncertainty that is correlated to a value and displaying results of the calculations performed.

In another example embodiment, the method may be performed wherein the neural network incorporates a machine learning model.

In another example embodiment, the method may be performed wherein the loss function is of a form of:

$$L(x, y, \theta) = \frac{1}{N}\sum_{i=1}^{N} \frac{1}{\sigma_i^2}\|f_\theta(x_i) - y_i\|^2 + \log[\sigma_i^2] + \alpha(\sigma_i - |f_\theta(x_i) - y_i|)^2.$$

In another example embodiment, the method may be performed wherein the value is a prediction error.

In another example embodiment, the method may be performed wherein the value is a prediction bias.

In another example embodiment, the method may be performed wherein the neural network has three hidden layers.

In another example embodiment, the method may be performed wherein a first term of the loss function relates to an accuracy.

In another example embodiment, the method may be performed wherein a second term of the loss function prevents an assignment of uncertainty values for all data points.

In another example embodiment, the method may be performed wherein a third term of the loss function represents an aleatoric uncertainty.

In one example embodiment, a non-transitory computer readable medium storing a program causing a computer to execute a process is disclosed. The process performed may comprise accepting a data set into a neural network. The process may further comprise performing calculations with the neural network using the data set, wherein the calculations use a loss function and provide an aleatoric and epistemic uncertainty that is correlated to a value and displaying results of the calculations performed.

In another embodiment, the neural network incorporates a machine learning model.

In another embodiment, the loss function is of a form of:

$$L(x, y, \theta) = \frac{1}{N}\sum_{i=1}^{N} \frac{1}{\sigma_i^2}\|f_\theta(x_i) - y_i\|^2 + \log[\sigma_i^2] + \alpha(\sigma_i - |f_\theta(x_i) - y_i|)^2.$$

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

9

The invention claimed is:

1. A method for performing a calculation, comprising:
    providing a neural network configured to generate a prediction;
    accepting a data set into the neural network, wherein the data set comprises a measured value;
    performing calculations with the neural network using the data set, wherein the calculations use a loss function and provide an aleatoric uncertainty and an epistemic uncertainty that are correlated to an error of the prediction and the measured value, wherein the loss function is of a form of:

$$L(x, y, \theta) = \frac{1}{N} \sum_{i=1}^{N} \frac{1}{\sigma_i^2} \|f_\theta(x_i) - y_i\|^2 + \log[\sigma_i^2] + \alpha(\sigma_i - |f_\theta(x_i) - y_i|)^2;$$

and
    displaying results of the calculations performed.

2. The method according to claim 1, wherein the neural network incorporates a machine learning model.

3. The method according to claim 1, wherein the error of the prediction and the measured value is a prediction bias.

4. The method according to claim 1, wherein the neural network has three hidden layers.

5. The method according to claim 1, wherein a first term of the loss function relates to an accuracy.

6. The method according to claim 1, wherein a second term of the loss function prevents an assignment of uncertainty values for all data points.

7. The method according to claim 1, wherein a third term of the loss function represents the aleatoric uncertainty.

8. The method of claim 1, wherein the data set comprises a geological scan of a geological formation, the method further comprising:
    analyzing, with the neural network, the data set to predict a highest concentration of hydrocarbons within the geological formation; and
    performing calculations with the neural network using the data set, wherein the calculations use the loss function and provide the aleatoric uncertainty and the epistemic uncertainty that are correlated to the error of the predicted highest concentration of hydrocarbons within the geological formation and an actual highest concentration of hydrocarbons within the geological formation.

9. The method of claim 8, further comprising training the neural network based on a result of the calculations using the loss function.

10. The method of claim 1, wherein the data set comprises a wireline scan of a geological formation, the method further comprising:
    analyzing, with the neural network, the data set to predict a geological parameter of the geological formation; and
    performing calculations with the neural network using the data set, wherein the calculations use the loss function and provide the aleatoric uncertainty and the epistemic uncertainty that are correlated to the error of the predicted geological parameter of the geological formation and an actual geological parameter of the geological formation.

11. The method of claim 10, further comprising training the neural network based on a result of the calculations using the loss function.

12. A non-transitory computer-readable medium, comprising computer-executable instructions that, when executed by processing circuitry, cause the processing circuitry to perform operations comprising:
    generating a prediction using a neural network;
    accepting a data set into the neural network, wherein the data set comprises a measured value;
    performing calculations with the neural network using the data set, wherein the calculations use a loss function and provide an aleatoric uncertainty and an epistemic uncertainty that are correlated to an error of the prediction and the measured value, wherein the loss function is of a form of:

$$L(x, y, \theta) = \frac{1}{N} \sum_{i=1}^{N} \frac{1}{\sigma_i^2} \|f_\theta(x_i) - y_i\|^2 + \log[\sigma_i^2] + \alpha(\sigma_i - |f_\theta(x_i) - y_i|)^2;$$

and
    displaying results of the calculations performed.

13. The non-transitory computer-readable medium of claim 12, wherein the computer-executable instructions, when executed by the processing circuitry, cause the processing circuitry to perform operations comprising:
    generating the prediction using a machine learning model incorporated by the neural network.

14. The non-transitory computer-readable medium of claim 12, wherein the data set comprises a geological scan of a geological formation, wherein the computer-executable instructions, when executed by the processing circuitry, cause the processing circuitry to perform operations comprising:
    analyzing, with the neural network, the data set to predict a highest concentration of hydrocarbons within the geological formation; and
    performing calculations with the neural network using the data set, wherein the calculations use the loss function and provide the aleatoric uncertainty and the epistemic uncertainty that are correlated to the error of the predicted highest concentration of hydrocarbons within the geological formation and an actual highest concentration of hydrocarbons within the geological formation.

15. The non-transitory computer-readable medium of claim 14, wherein the computer-executable instructions, when executed by the processing circuitry, cause the processing circuitry to perform operations further comprising training the neural network based on a result of the calculations using the loss function.

16. The non-transitory computer-readable medium of claim 12, wherein the data set comprises a wireline scan of a geological formation, wherein the computer-executable instructions, when executed by the processing circuitry, cause the processing circuitry to perform operations comprising:
    analyzing, with the neural network, the data set to predict a geological parameter of the geological formation; and
    performing calculations with the neural network using the data set, wherein the calculations use the loss function and provide the aleatoric uncertainty and the epistemic uncertainty that are correlated to the error of the predicted geological parameter of the geological formation and an actual geological parameter of the geological formation.

17. The non-transitory computer-readable medium of claim 16, wherein the computer-executable instructions, when executed by the processing circuitry, cause the processing circuitry to perform operations further comprising training the neural network based on a result of the calculations using the loss function.

18. The non-transitory computer-readable medium of claim 12, wherein a first term of the loss function relates to an accuracy.

19. The non-transitory computer-readable medium of claim 12, wherein a second term of the loss function prevents an assignment of uncertainty values for all data points.

20. The non-transitory computer-readable medium of claim 12, wherein a third term of the loss function represents the aleatoric uncertainty.

* * * * *